US011779965B2

(12) United States Patent
Good

(10) Patent No.: US 11,779,965 B2
(45) Date of Patent: Oct. 10, 2023

(54) FLEXIBLE AND EXTENDABLE CONDUIT DESCALING ARTICLE

(71) Applicant: Brian Good, Trumbull, CT (US)

(72) Inventor: Brian Good, Trumbull, CT (US)

( * ) Notice: Subject to any disclaimer, the term of this patent is extended or adjusted under 35 U.S.C. 154(b) by 289 days.

(21) Appl. No.: 17/343,537

(22) Filed: Jun. 9, 2021

(65) Prior Publication Data

US 2021/0379633 A1    Dec. 9, 2021

Related U.S. Application Data

(60) Provisional application No. 63/036,728, filed on Jun. 9, 2020.

(51) Int. Cl.
| | |
|---|---|
| *B08B 9/045* | (2006.01) |
| *F16L 55/28* | (2006.01) |
| *E03C 1/302* | (2006.01) |
| *B08B 9/043* | (2006.01) |
| *F16L 101/12* | (2006.01) |

(52) U.S. Cl.
CPC ............ *B08B 9/045* (2013.01); *B08B 9/0436* (2013.01); *E03C 1/302* (2013.01); *F16L 55/28* (2013.01); *B08B 2209/04* (2013.01); *F16L 2101/12* (2013.01)

(58) Field of Classification Search
CPC ... B08B 9/045; B08B 9/0436; B08B 2209/04; E03C 1/302; F16L 55/28; F16L 55/40; F16L 2101/12
See application file for complete search history.

(56) References Cited

FOREIGN PATENT DOCUMENTS

| CN | 110296294 A | * 10/2019 |
| GB | 684584 | * 12/1952 |
| KR | 10-2014-0147391 | * 12/2014 |

* cited by examiner

*Primary Examiner* — Randall E Chin
(74) *Attorney, Agent, or Firm* — Steven M McHugh; Cantor Colburn, LLP

(57) ABSTRACT

A Conduit Descaling System (CDS) is provided and includes an anchor structure, wherein the anchor structure includes a first anchor end, a second anchor end and a structure center portion and wherein the structure center portion connects the first anchor end with the second anchor end; a descaling chain ring, wherein the descaling chain ring defines a chain ring center cavity and is connected to the structure center portion; and a Forward Descaling Article (FDA), wherein the FDA includes an FDA structure having an FDA structure first end, an FDA structure second end and an FDA structure center portion, wherein the FDA structure center portion includes a plurality of FDA anchor structures distributed along the circumference of the FDA structure center portion, and wherein FDA further includes a plurality of FDA descaling links having a plurality of FDA descaling link cutting teeth.

1 Claim, 20 Drawing Sheets

FLEXIBLE AND EXTENDABLE CONDUIT DESCALING ARTICLE

CROSS-REFERENCE TO RELATED APPLICATIONS

This application claims the benefit of priority of the filing date of U.S. Provisional Patent Application Ser. No. 63/036,728, filed on Jun. 9, 2020 which is incorporated by reference herein in its entirety.

FIELD OF THE INVENTION

The present invention relates generally to an article for descaling pipes, tubes and other conduits and more particularly to an improved article and method for descaling pipes, tubes and other conduits whereby the improved article and method is more robust and effective than existing articles and methods.

BACKGROUND OF THE INVENTION

There are many types of systems that utilize pipes/tubes and other conduits to contain fluids and/or move fluids from one place to another. These systems include chillers, condensers, heat exchangers, boilers, building plumbing, etc. and are well known. For example, a chiller is a device that removes heat from a liquid via a vapor-compression or absorption refrigeration cycle. This cooled liquid can then be used to cool air (such as for air conditioning) or other equipment. When used as air conditioning, the cooled, or chilled, liquid it typically circulated to heat exchangers (or subsequently equivalent structures) which facilitates the transfer of heat (sensible and latent) from the air to the chilled liquid. As such, the liquid absorbs the heat and re-circulated back to the chiller to be cooled again. Accordingly, it is essential to the operation of the chiller (and other systems that utilize pipes/tubes) that the circulation of the liquid is unimpeded as it flows through the pipes/conduits. This is particularly important for industrial applications, where the chiller is used to control the cooling of products, mechanisms and other factory machinery.

Another example involves the plumbing in a residential or commercial building and/or sewers that carry fluids or slurry from one place to another. In this situation it is essential to the operation of the plumbing and/or sewer system that the flow of the fluids or slurry is unimpeded as it flows through the pipes/conduits.

Unfortunately, however, as fluids flow through pipes and conduits, limescale and other debris, such as hardened detritus, builds up and adheres to the inner walls of the pipe and/or conduit. Limescale, which is caused by the conversion of soluble calcium bicarbonate into insoluble calcium carbonate, a hard chalky substance that forms as a crust on the inner walls of the pipe and/or conduit, typically occurs in places where water is either heated or left standing. Hardened detritus is a dead particulate organic material, as distinguished from dissolved organic material. Detritus includes the bodies or fragments of bodies of dead organisms, and fecal material and typically hosts communities of microorganisms that colonize and decompose. This is undesirable because buildup of limescale and/or hardened detritus decreases the inner diameter of the pipe and/or conduit and thereby impedes the flow of fluid and/or slurry therein. Additionally, if the limescale and/or hardened detritus is allowed to build up too much, fluid and/or slurry flow could be stopped altogether.

It should be appreciated that currently there are many devices designed to descale the internal walls of pipes and conduits. One such device is a grinding chain which may or may not include carbine grinding teeth. This grinding chain is connected to a rotary oscillation device and inserted into a pipe or conduit. As the grinding chain rotates, the grinding chain is moved back and forth inside of the pipe or conduit and contacts the inner walls of the pipe or conduit, thereby 'scraping' the limescale, hardened detritus and/or debris from the inner walls of the pipe or conduit. Unfortunately, the current grinding chain designs are not very robust and lack several characteristics that would be beneficial to descaling operations.

SUMMARY OF THE INVENTION

A Conduit Descaling System (CDS) is provided and includes an anchor structure, wherein the anchor structure includes a first anchor end, a second anchor end and a structure center portion and wherein the structure center portion connects the first anchor end with the second anchor end; a descaling chain ring, wherein the descaling chain ring defines a chain ring center cavity and is connected to the structure center portion; and a Forward Descaling Article (FDA), wherein the FDA includes an FDA structure having an FDA structure first end, an FDA structure second end and an FDA structure center portion, wherein the FDA structure center portion includes a plurality of FDA anchor structures distributed along the circumference of the FDA structure center portion, and wherein FDA further includes a plurality of FDA descaling links having a plurality of FDA descaling link cutting teeth.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

Figure 1:
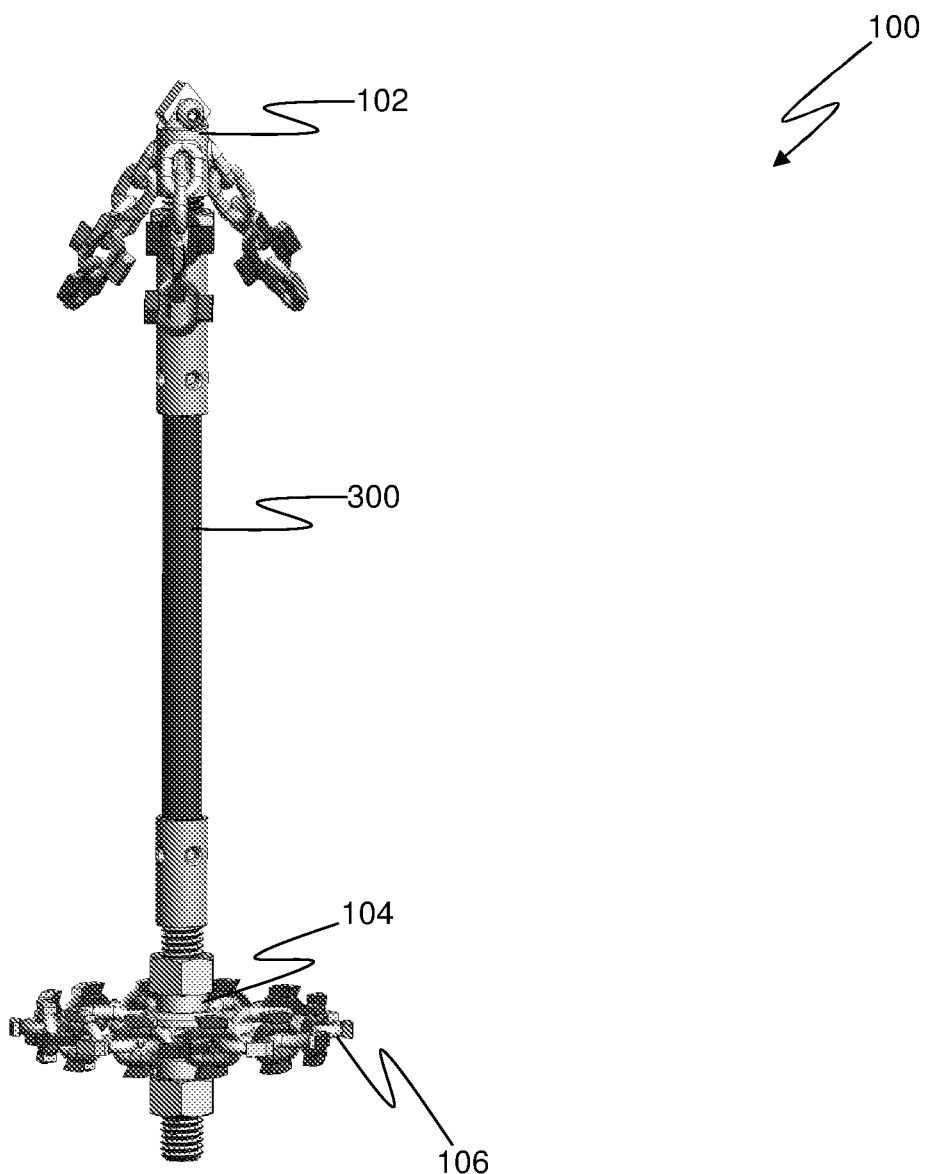
FIG. 1 is a side view of a Conduit Descaling System (CDS), in accordance with one embodiment of the invention.
Figure 2:
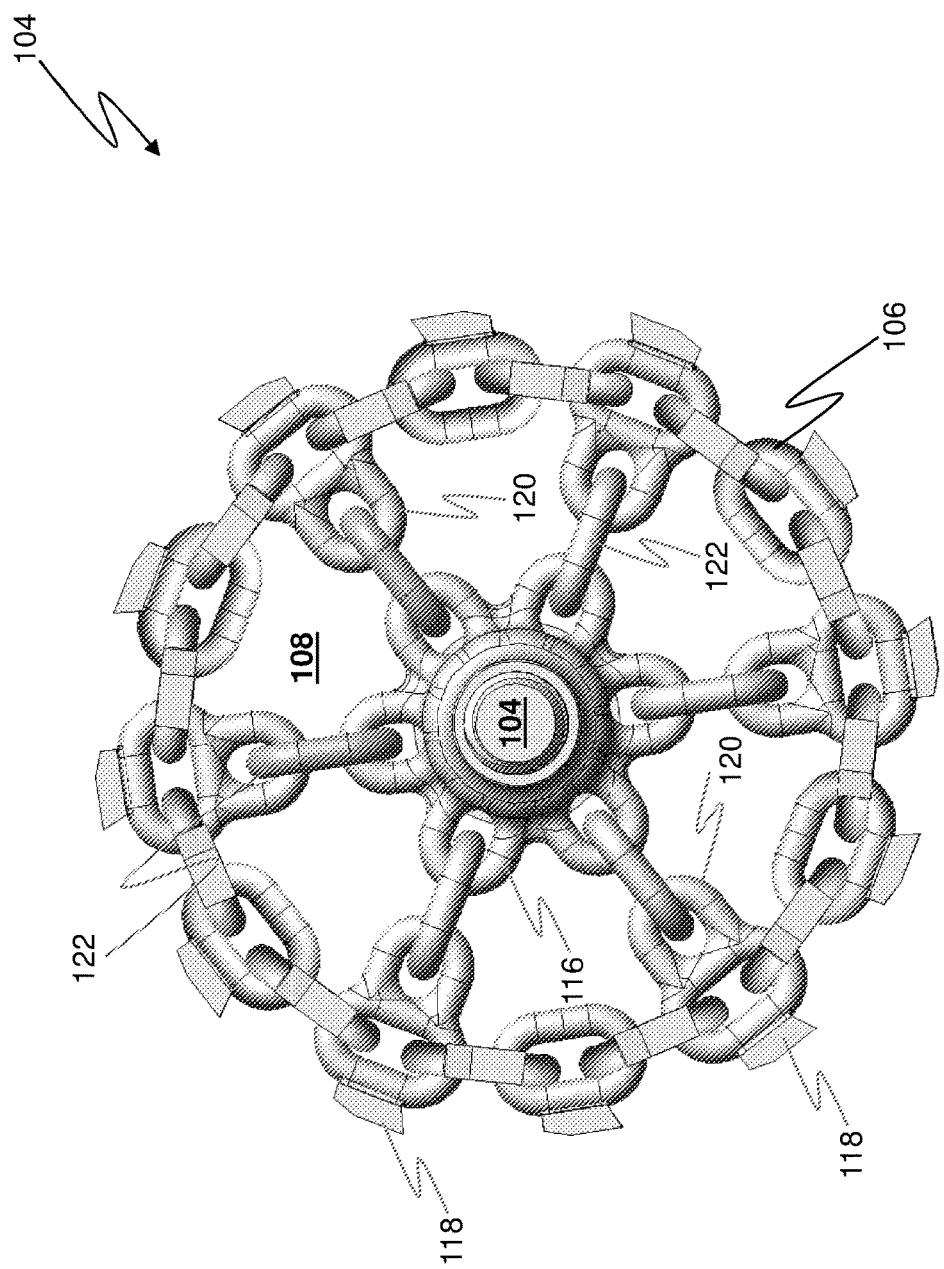
FIG. 2 is a top down view of a Conduit Descaling Article (CDA) for use with the Conduit Descaling System (CDS) of FIG. 1, in accordance with one embodiment of the invention.
Figure 3:
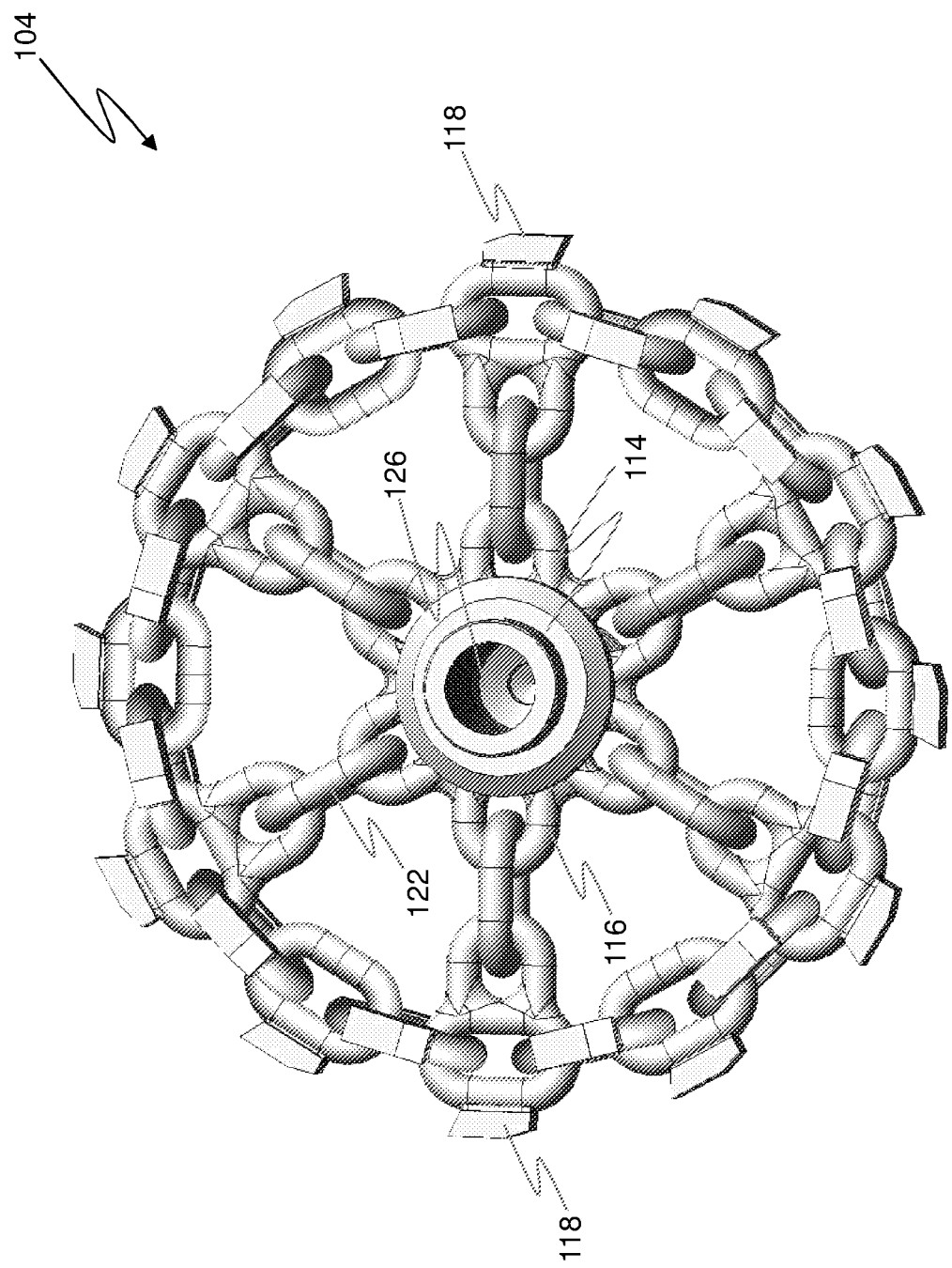
FIG. 3 is a bottom up view of the CDA of FIG. 2.
Figure 4A:
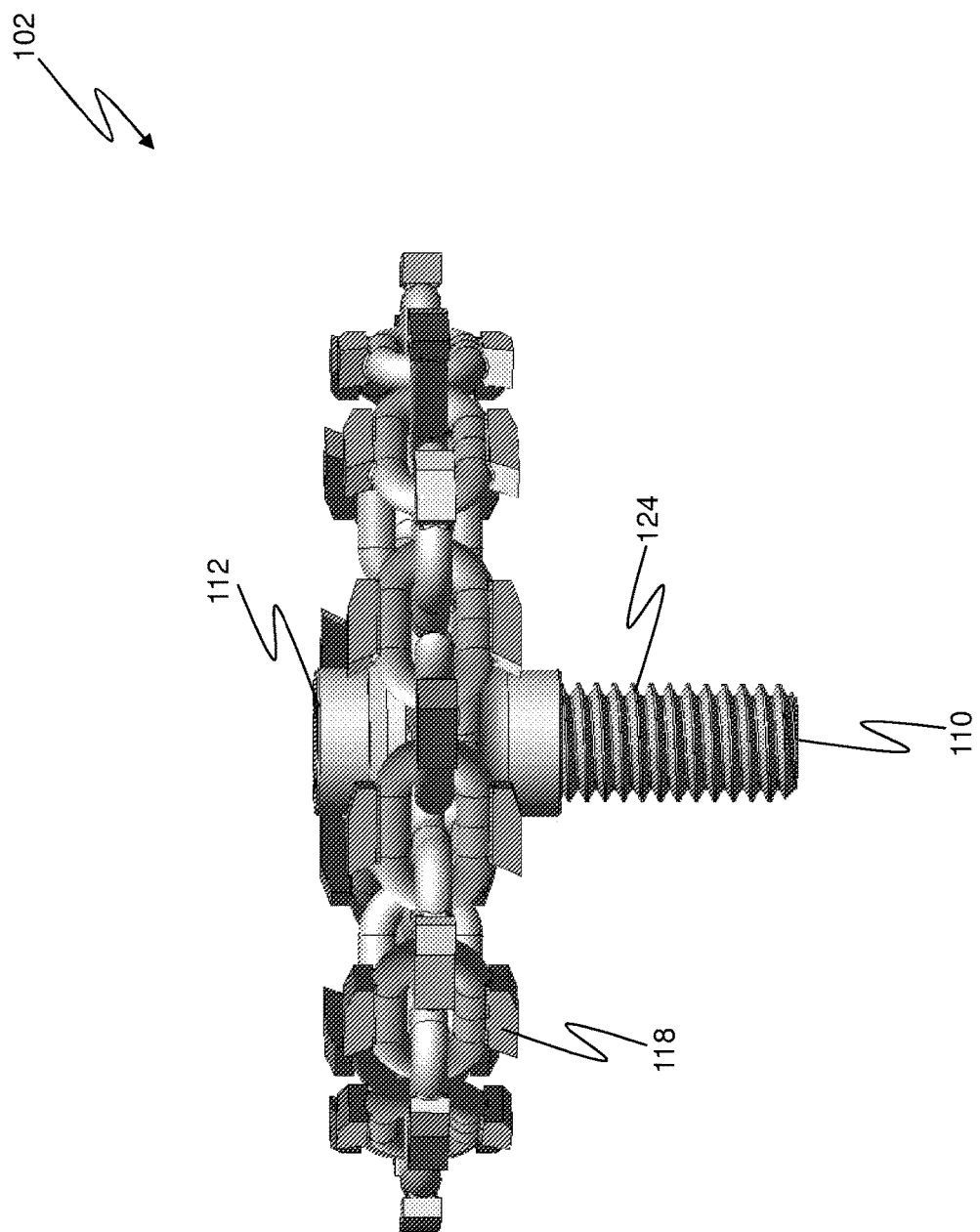
FIG. 4A is a side view of the CDA of FIG. 2.
Figure 4B:
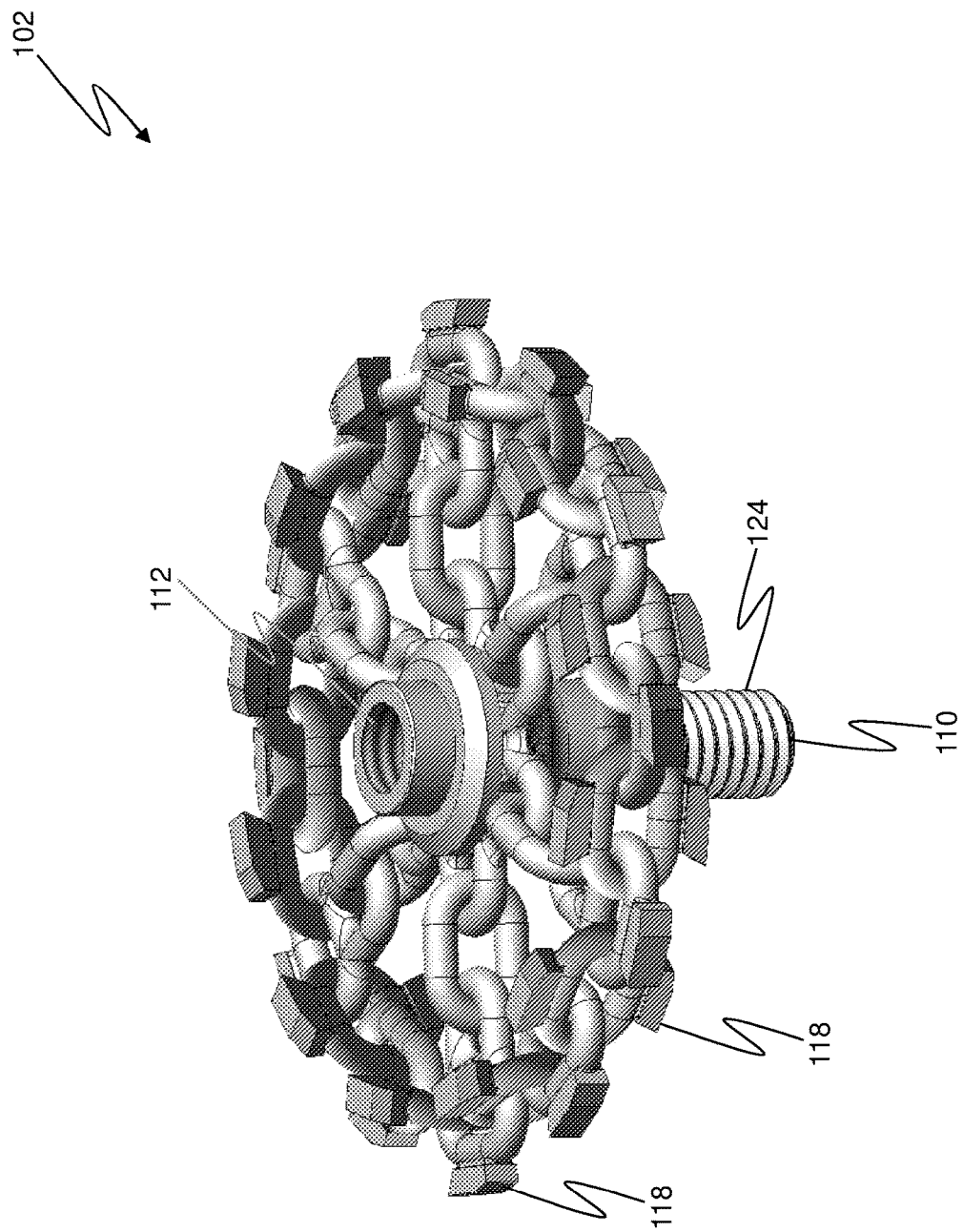
FIG. 4B is a perspective side view of the CDA of FIG. 2.
Figure 5:
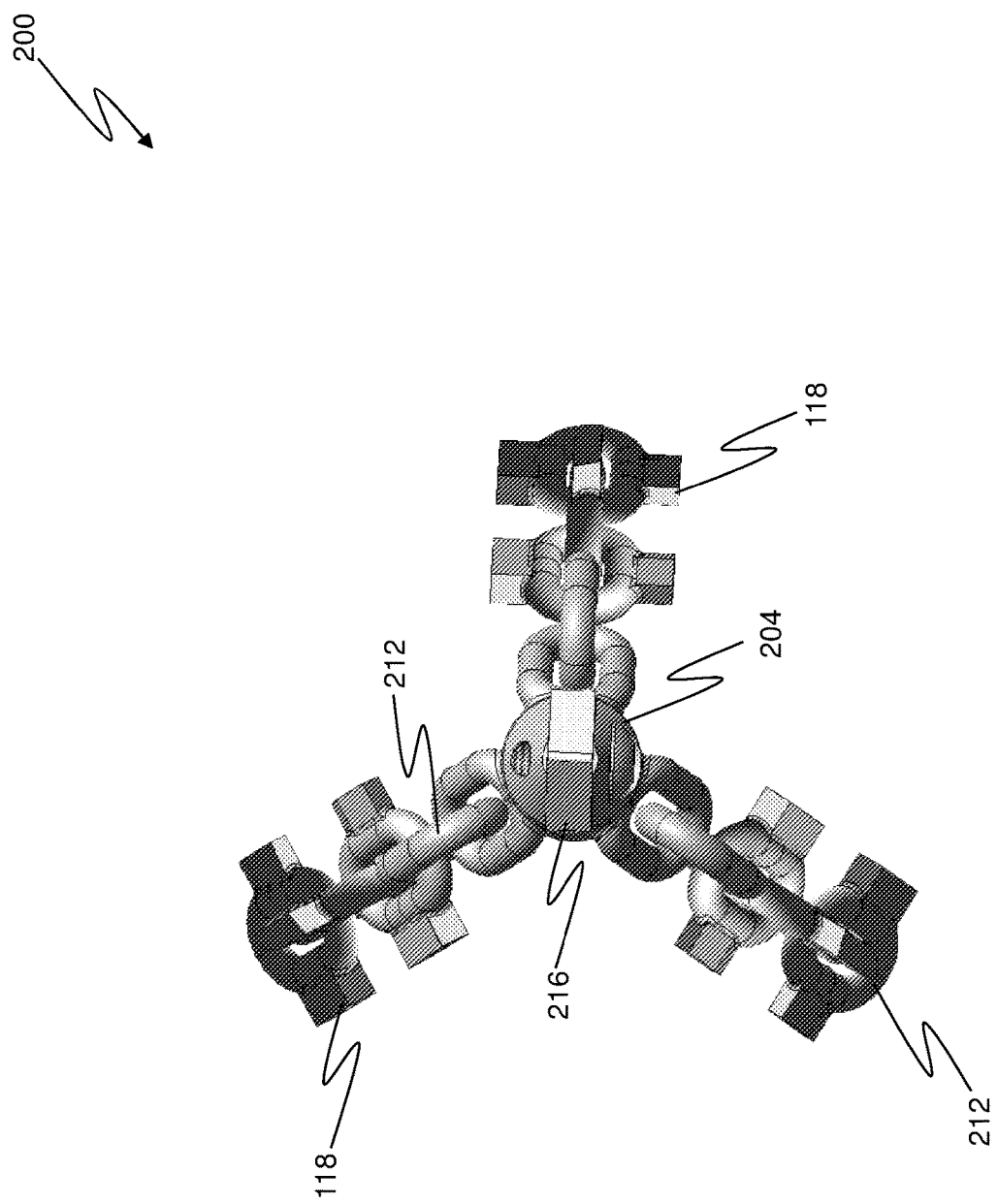
FIG. 5 is a top down view of a Forward Descaling Article (FDA) for use with the Conduit Descaling System (CDS) of FIG. 1, in accordance with one embodiment of the invention.
Figure 6A:
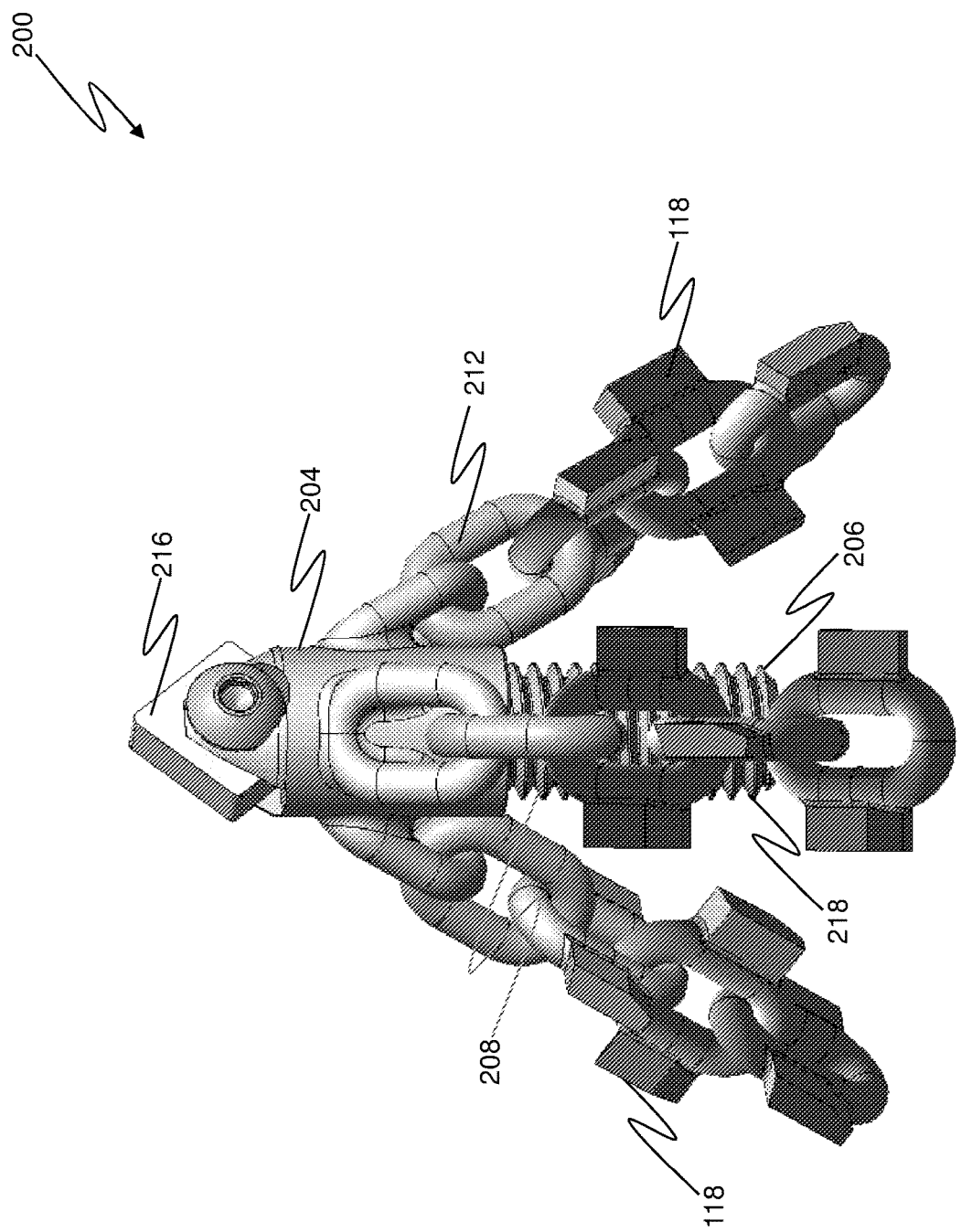
FIG. 6A is a side view of the FDA of FIG. 5.
Figure 6B:
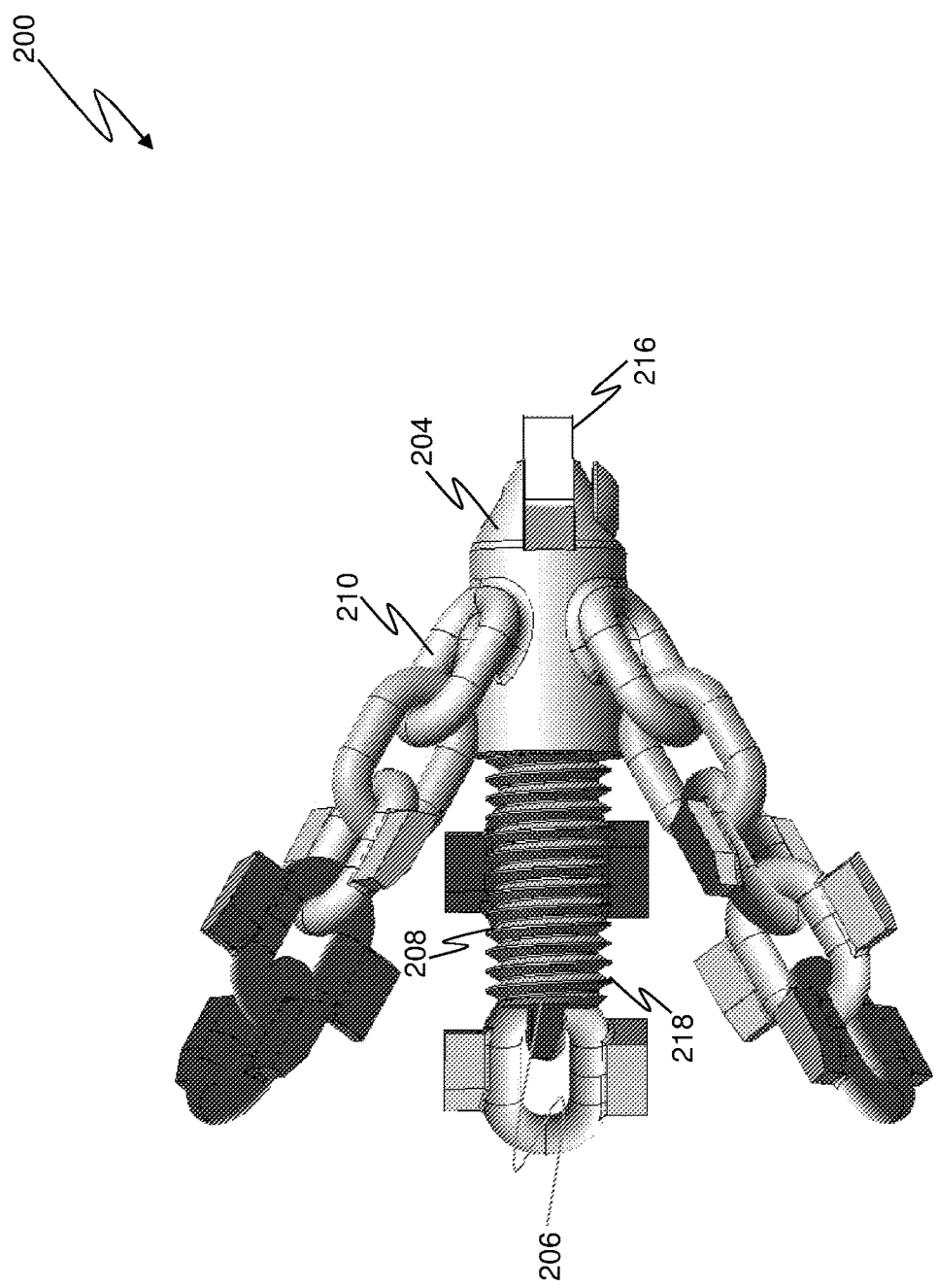
FIG. 6B is a side view of the FDA of FIG. 5.
Figure 7:
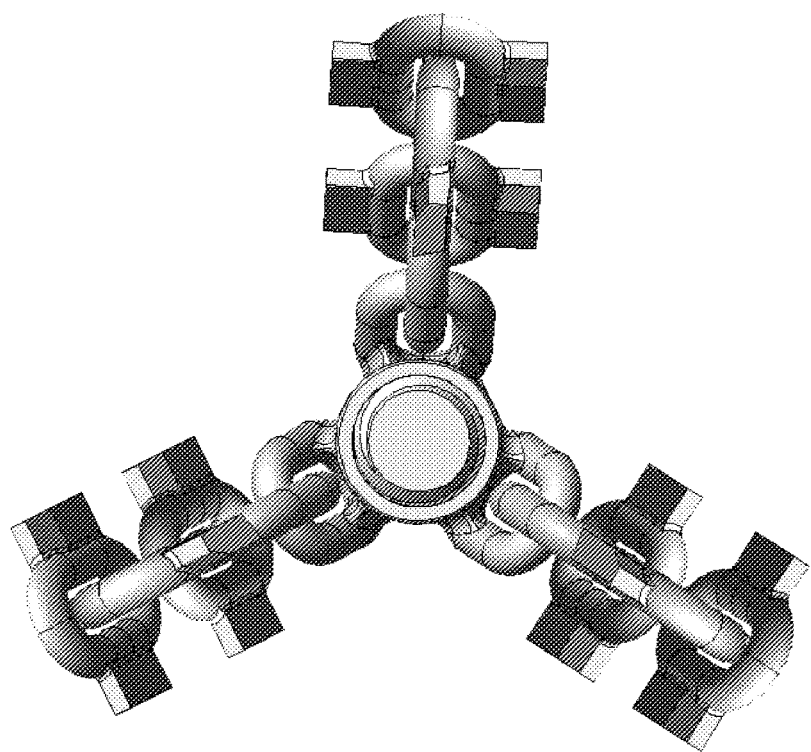
FIG. 7 is a bottom up view of the FDA of FIG. 5.
Figure 8:
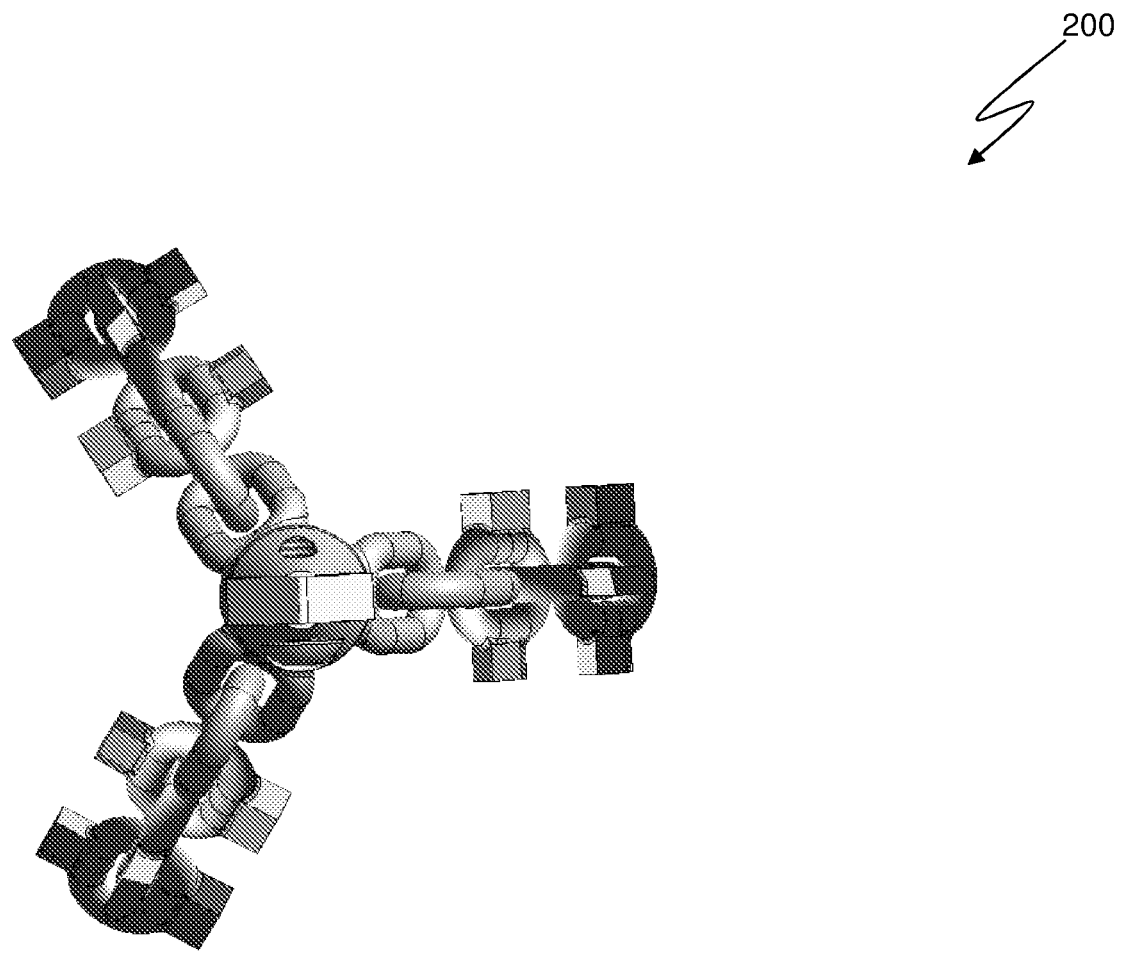
FIG. 8 is a top down view of the FDA of FIG. 5.
Figure 9:
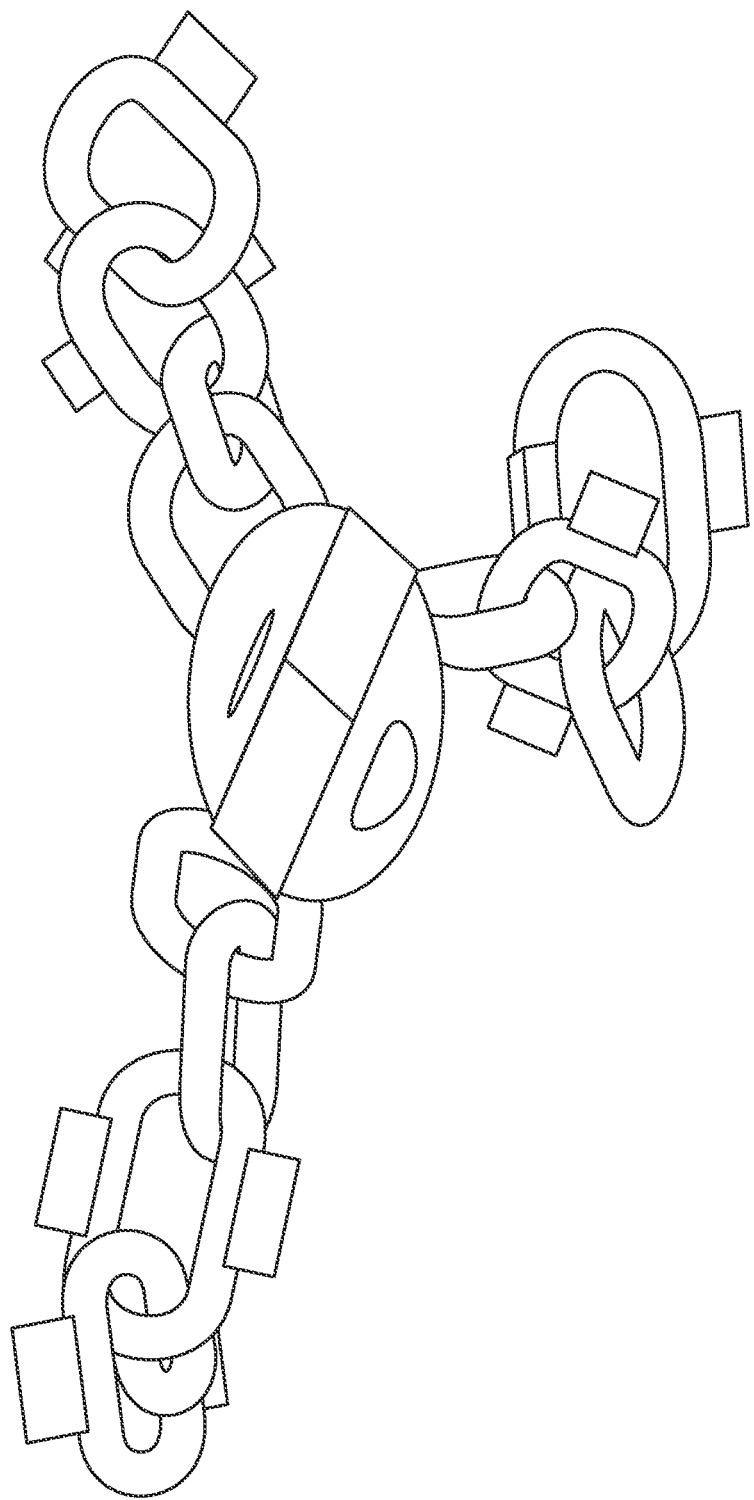
FIG. 9 is a top down view of the FDA of FIG. 5.
Figure 10C:
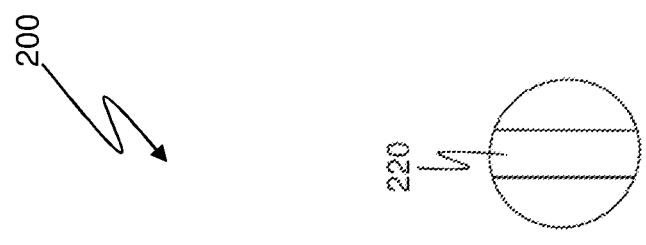
FIG. 10C is a top down view of the FDA structure first end of the CDS of FIG. 1 without the pointed descaling structure, in accordance with one embodiment of the invention.
Figure 10B:
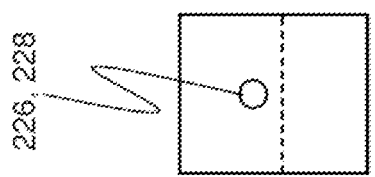
FIG. 10B is a front view of the FDA structure first end of the CDS of FIG. 1 without the pointed descaling structure, in accordance with one embodiment of the invention.
Figure 10A:
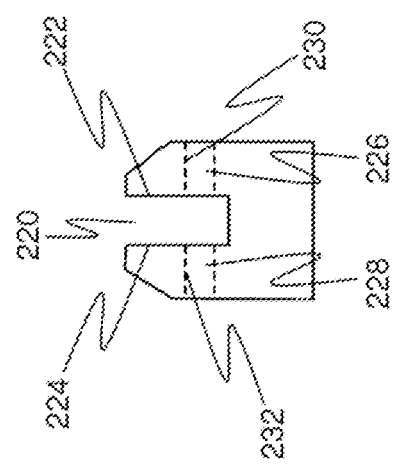
FIG. 10A is a side view of the FDA structure first end of the CDS of FIG. 1 without the pointed descaling structure, in accordance with one embodiment of the invention.
Figure 10E:
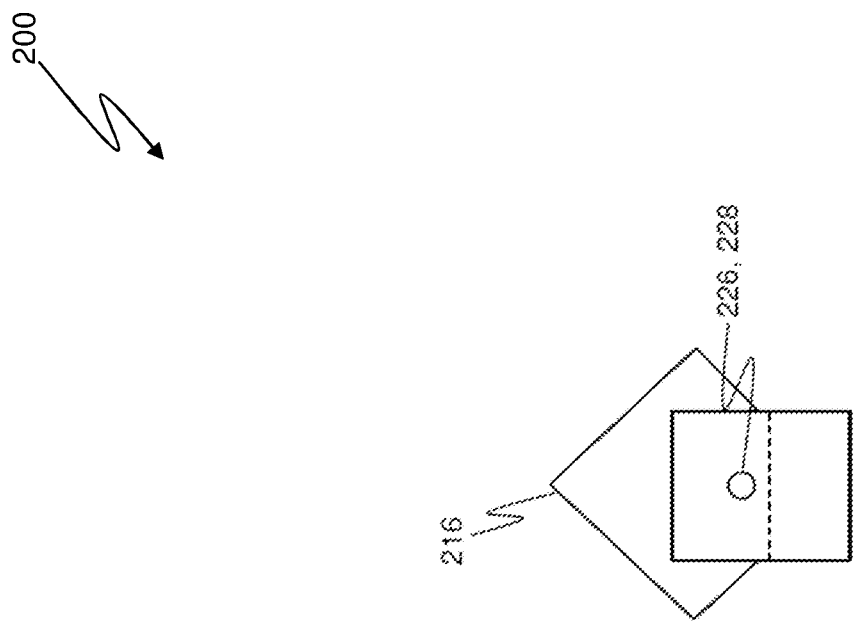
FIG. 10E is a front view of the FDA structure first end associated with the pointed descaling structure of the CDS of FIG. 1, in accordance with one embodiment of the invention.
Figure 10D:
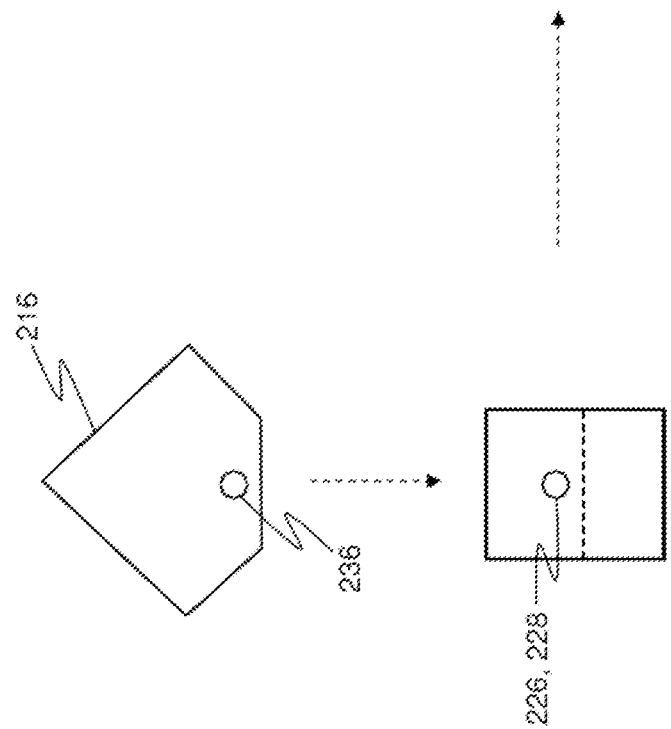
FIG. 10D is a front view of the FDA structure first end being associated with the pointed descaling structure of the CDS of FIG. 1, in accordance with one embodiment of the invention.
Figure 10G:
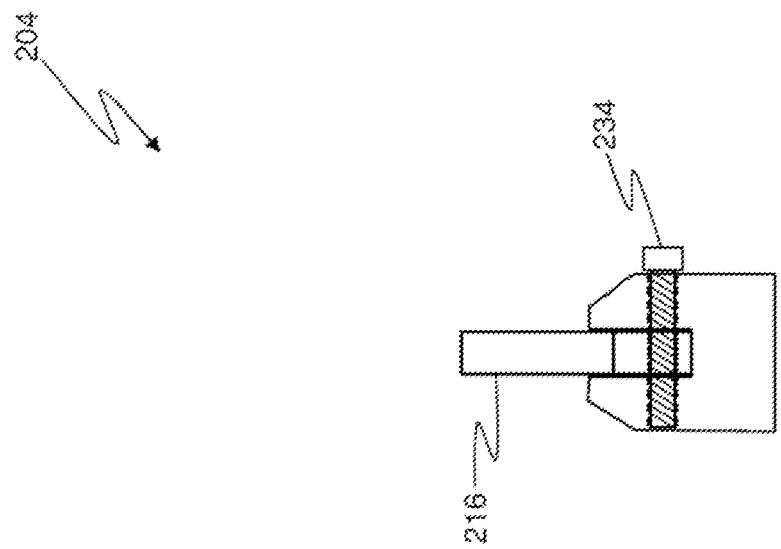
FIG. 10G is a side view of the FDA structure first end associated with the pointed descaling structure of the CDS of FIG. 1, in accordance with one embodiment of the invention.
Figure 10F:
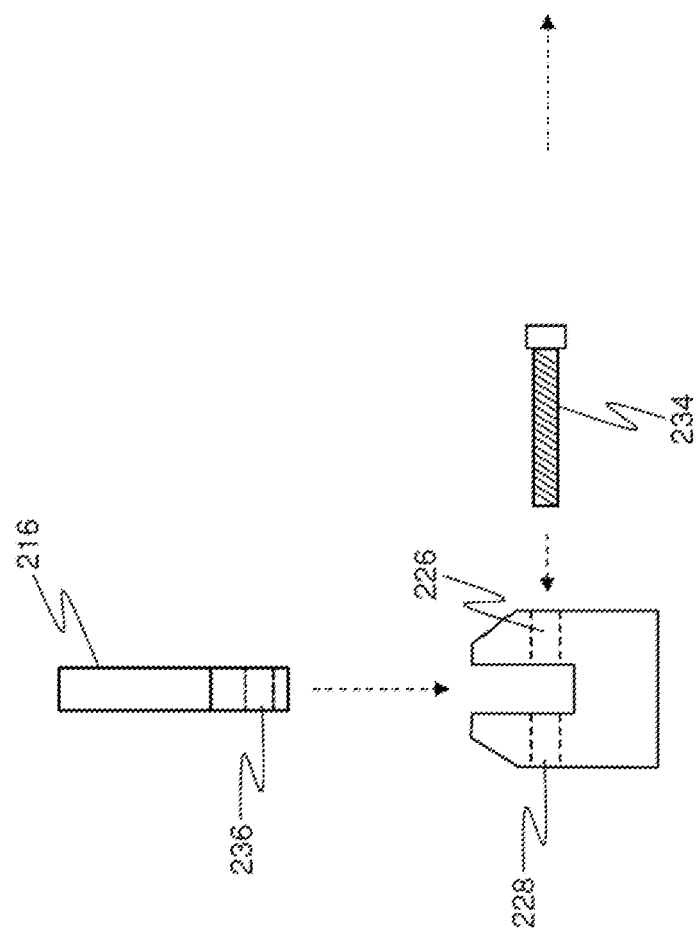
FIG. 10F is a side view of the FDA structure first end being associated with the pointed descaling structure of the CDS of FIG. 1, in accordance with one embodiment of the invention.

Referring to FIG. 1, a Conduit Descaling System (CDS) 100 is shown, in accordance with one embodiment of the invention. Referring to FIG. 2, FIG. 3, FIG. 4a and FIG. 4B, a Conduit Descaling System (CDS) 100 having a Conduit Descaling Article (CDA) 102 is shown in accordance with one embodiment of the invention and includes an anchor structure 104 and a descaling chain ring 106, wherein the descaling chain ring 106 defines a chain ring center cavity 108. The anchor structure 104 includes a first anchor end 110, a second anchor end 112 and a structure center portion 114, wherein the structure center portion 114 connects the first anchor end 110 with the second anchor end 112. The anchor structure 104 further includes a plurality of anchor connecting members 116, wherein the plurality of anchor connecting members 116 are connected to and distributed around the circumference of the structure center portion 114. Additionally, the descaling chain ring 106 includes a plurality of anchor cutting teeth 118 and chain ring connectors 120, wherein the chain ring connectors 120 are configured to extend out of the descaling chain ring 106 and into the chain ring center cavity 108. It should be appreciated that the plurality of chain ring connectors 120 are distributed around the circumference of the descaling chain ring 106. Accordingly, each one of the plurality of chain ring connectors 120 is located proximate to and connected to one of the plurality of anchor connecting members 116 via a separate connector link 122. Accordingly, this configuration forms a plurality of chain ring connector 120—anchor connecting member 116 pairs. It should be appreciated that the first anchor end 110 includes a first end threaded portion 124 and may be configured as a male and the second anchor end 112 includes a second end threaded portion 126 and may be configured as a female.

It should be appreciated that the unique and novel design of the CDA 102 advantageously allows the CDA 102 to be reversible. The novel design of the first anchor end 110 and the second anchor end 112 allows either end of the CDA 102 to be connected to a drill (or other type of rotary oscillator). Accordingly, the descaling chain ring 106 can be configured to rotate in either direction. This advantageously the wear of the anchor cutting teeth 118 to be more evenly controlled, thereby increasing the life of the anchor cutting teeth 118 and the life of the CDA 102.

Referring to FIG. 5, FIG. 6A, FIG. 6B, FIG. 7, FIG. 8 and FIG. 9, the CDS 100 further includes a Forward Descaling Article (FDA) 200, wherein the FDA 200 includes an FDA structure 202 having an FDA structure first end 204, an FDA structure second end 206 and an FDA structure center portion 208. It should be appreciated that the FDA structure center portion 208 includes a plurality of FDA anchor structures 210 which are distributed along the circumference of the FDA structure center portion 208. It should be further appreciated that the FDA 200 further includes a plurality of FDA descaling links 212 having a plurality of FDA descaling link cutting teeth 214. The FDA structure first end 204 includes a pointed descaling structure 216 and the FDA structure second end 206 includes an FDA threaded portion 218 which is configured as a male. It should be appreciated that the pointed descaling structure 216 may be a single point structure or a multi-point structure as desired.

Referring to FIG. 10A, FIG. 10B, FIG. 10C, FIG. 10D, FIG. 10E, FIG. 10F and FIG. 10G, it should be appreciated that the FDA structure first end 204 defines a first end channel 220 and includes a first end first wall 222 and a first end second wall 224, wherein the first end first wall 222 and first end second wall 224 are separated by the first end channel 220. The first end first wall 222 defines a first wall mounting cavity 226 and the first end second wall 224 defines a second wall mounting cavity 228, wherein the first wall mounting cavity 226 includes a first wall cavity inner surface 230 and the second wall mounting cavity 228 includes a second wall cavity inner surface 232. It should be appreciated that, in one embodiment, the first wall cavity inner surface 230 and the second wall cavity inner surface 232 include a threaded portion for threadingly interacting with a mounting screw 234. Additionally, the pointed descaling structure 216 defines a descaling structure cavity 236 which may or may not be threaded. It should be appreciated that the first end channel 220 is configured to contain the pointed descaling structure 216. Moreover, when the pointed descaling structure 216 is located within the first end channel 220, the descaling structure cavity 236, the first wall mounting cavity 226 and second wall mounting cavity 228 are positioned to be aligned with each other. Accordingly, the mounting screw 234 may be associated with the first wall mounting cavity 226, the descaling structure cavity 236 and the second wall mounting cavity 228 to securely associate the pointed descaling structure 216 with the FDA structure first end 204.

Figure 11:
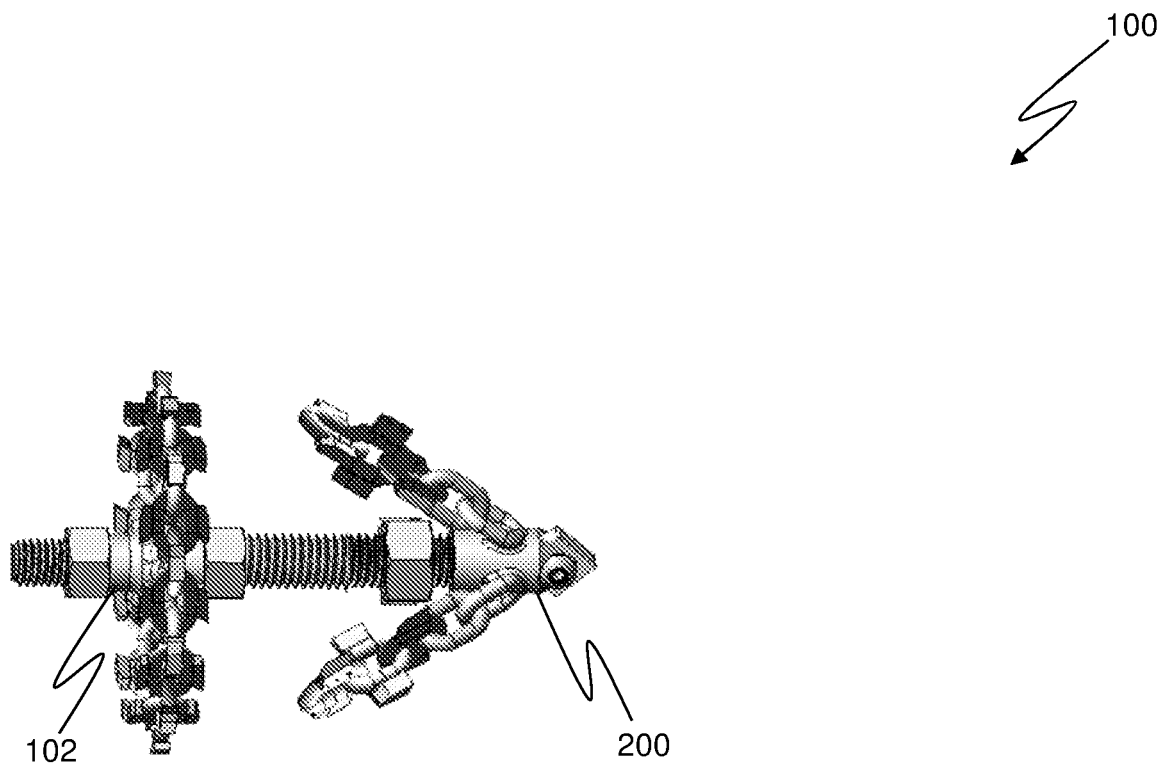
FIG. 11 is a side view of the CDS of FIG. 1 showing only the CDA and the FDA connected together, in accordance with one embodiment of the invention.
Figure 12:
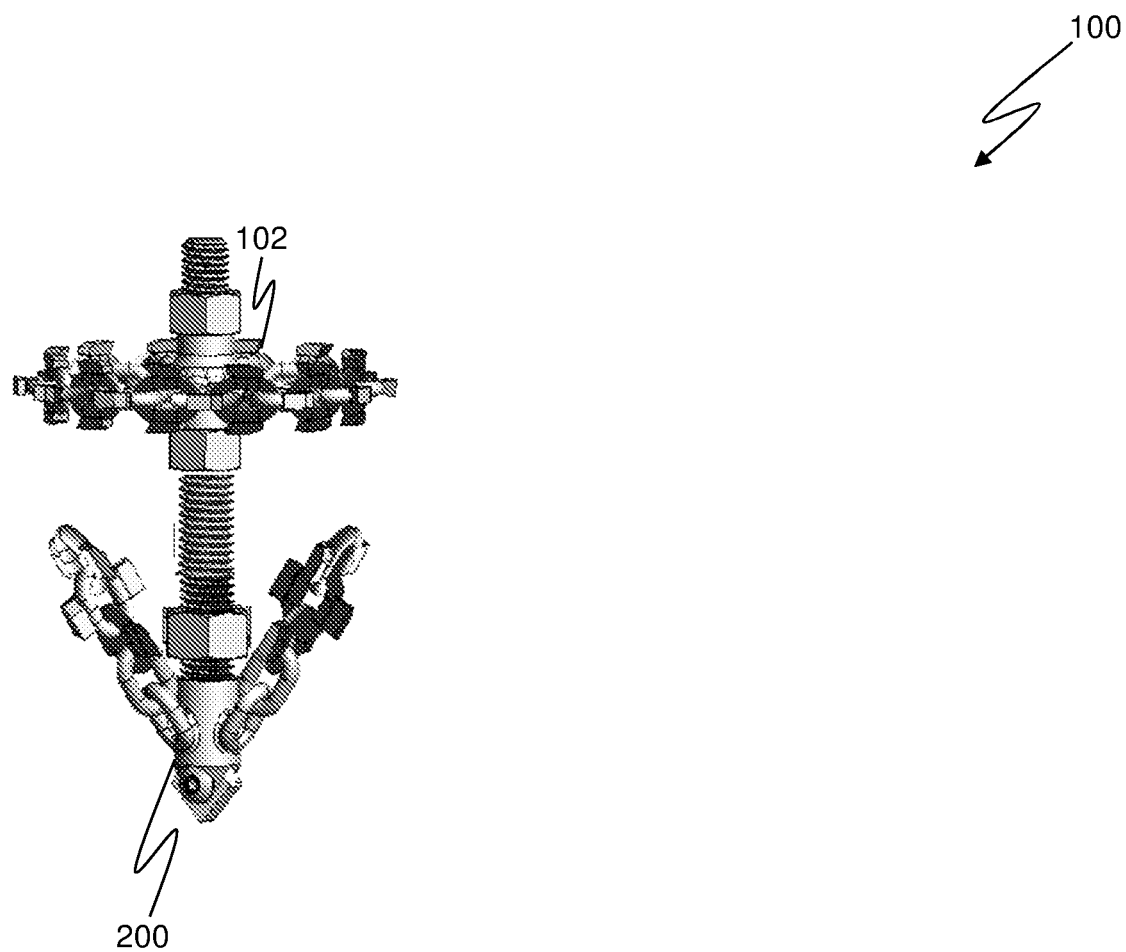
FIG. 12 is a side view of the CDS of FIG. 1 showing only the CDA and the FDA connected together, in accordance with one embodiment of the invention.

Referring to FIG. 11 and FIG. 12, the CDA 102 and the FDA 200 are shown connected to each other, in accordance with one embodiment of the invention. In this embodiment, the FDA structure second end 206, which is configured in a threaded male configuration, is threadingly located within the second anchor end 112, which is configured in a threaded female configuration. The combination of the CDA 102 and the FDA 200 in this embodiment may be used by associating the first anchor end 110 of the CDA 102, which is configured in threaded male configuration, with a device, such as a drill, which may cause the combination of the CDA 102 and the FDA 200 to rotate about an axis which is parallel with the CDA 102 and the FDA 200 combination. As the CDA 102 and the FDA 200 combination rotates, the CDA 102 and the FDA 200 combination is inserted into and through a pipe (or other conduit). As the CDA 102 and the FDA 200 combination rotate, the pointed descaling structure 216 on the FDA structure first end 204 breaks up and dislodges any blockage in the pipe (or other conduit). Additionally, as the CDA 102 and the FDA 200 combination rotate, the descaling chain ring 106 and the plurality of FDA descaling links 212 contact the inside wall of the pipe (or other conduit), whereby the anchor cutting teeth 118 and the FDA descaling link cutting teeth 214 act to remove debris (i.e. descale) from the surface of the inside wall of the pipe (or other conduit).

Figure 13:
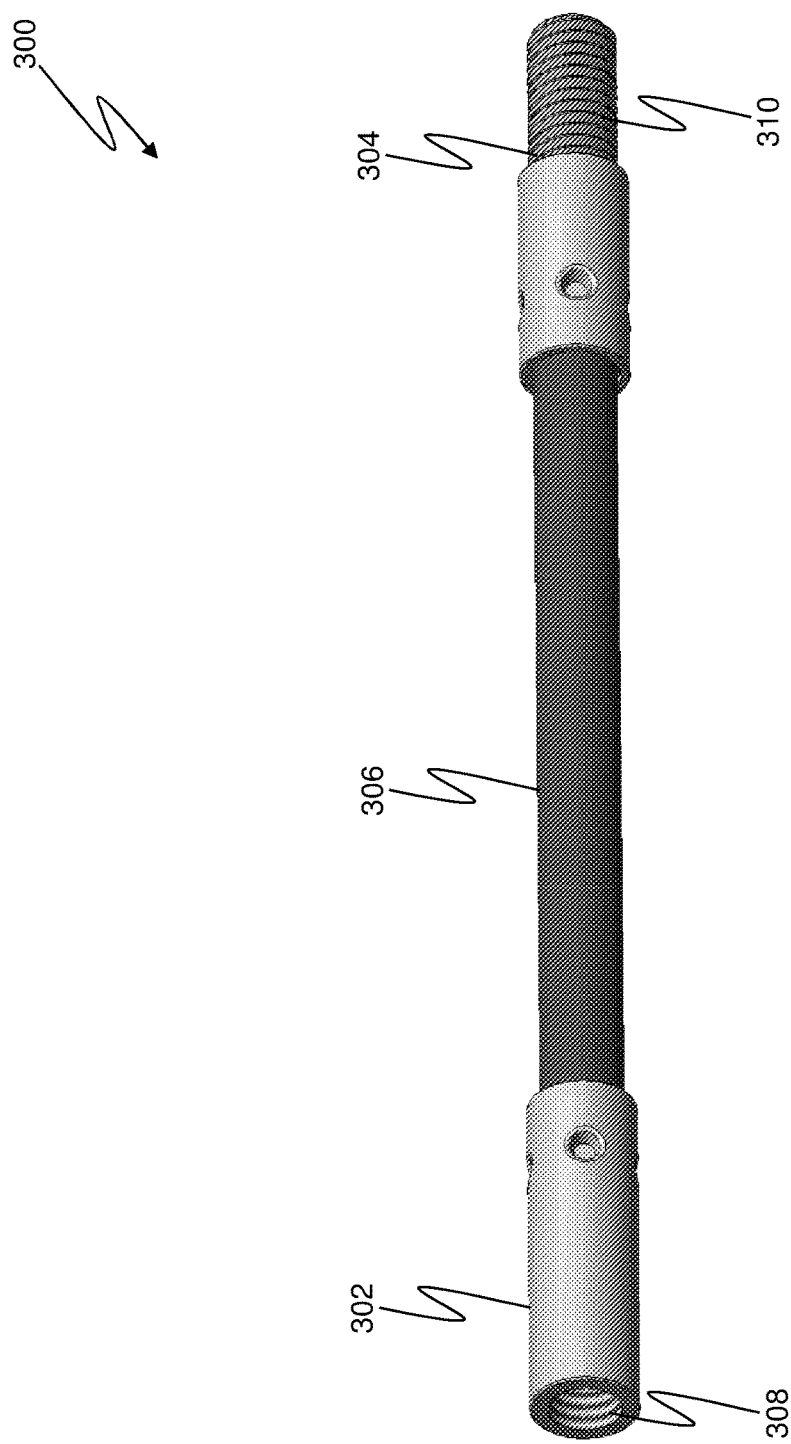
FIG. 13 is a side view of an extension member for use with the Conduit Descaling System (CDS) of FIG. 1, in accordance with one embodiment of the invention.

Referring to FIG. 13, the CDS 100 may further include an extension member 300 which allows the CDS 100 to include multiple CDA's 102 (in a daisy chain fashion), in accordance with one embodiment of the invention. The extension member 300 includes an extension member first end 302 and an extension member second end 304, wherein the extension member first end 302 is connected and separated from the extension member second end 304 by an extension member center portion 306. It should be appreciated that the extension member center portion 306 may be flexible to allow the extension member 300 to bend. It is contemplated that in some embodiments, the extension member 300 may be resiliently flexible and in other embodiments, the extension member 300 may be non-resiliently flexible. In accordance with the present invention, the extension member 300 is configured to securingly connect with both the CDA 102 and FDA 200. It should be appreciated that the extension member first end 302 may include a threaded portion 308 and may be configured as a female, while the extension member second end 304 may include a threaded portion 310 and may be configured as a male.

Figure 14A:
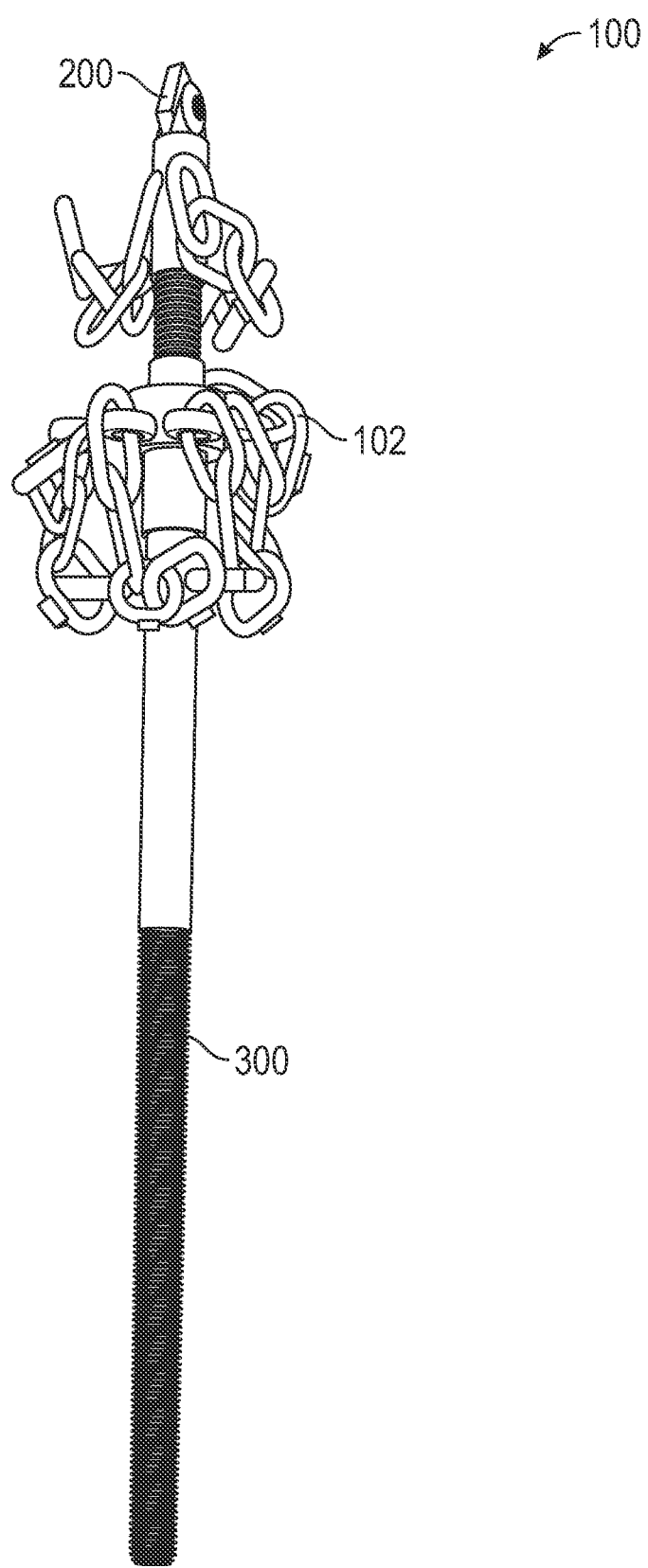
FIG. 14A is a side view of the CDS of FIG. 1, showing the CDA, the FDA and the extension member connected together, in accordance with one embodiment of the invention.
Figure 14B:
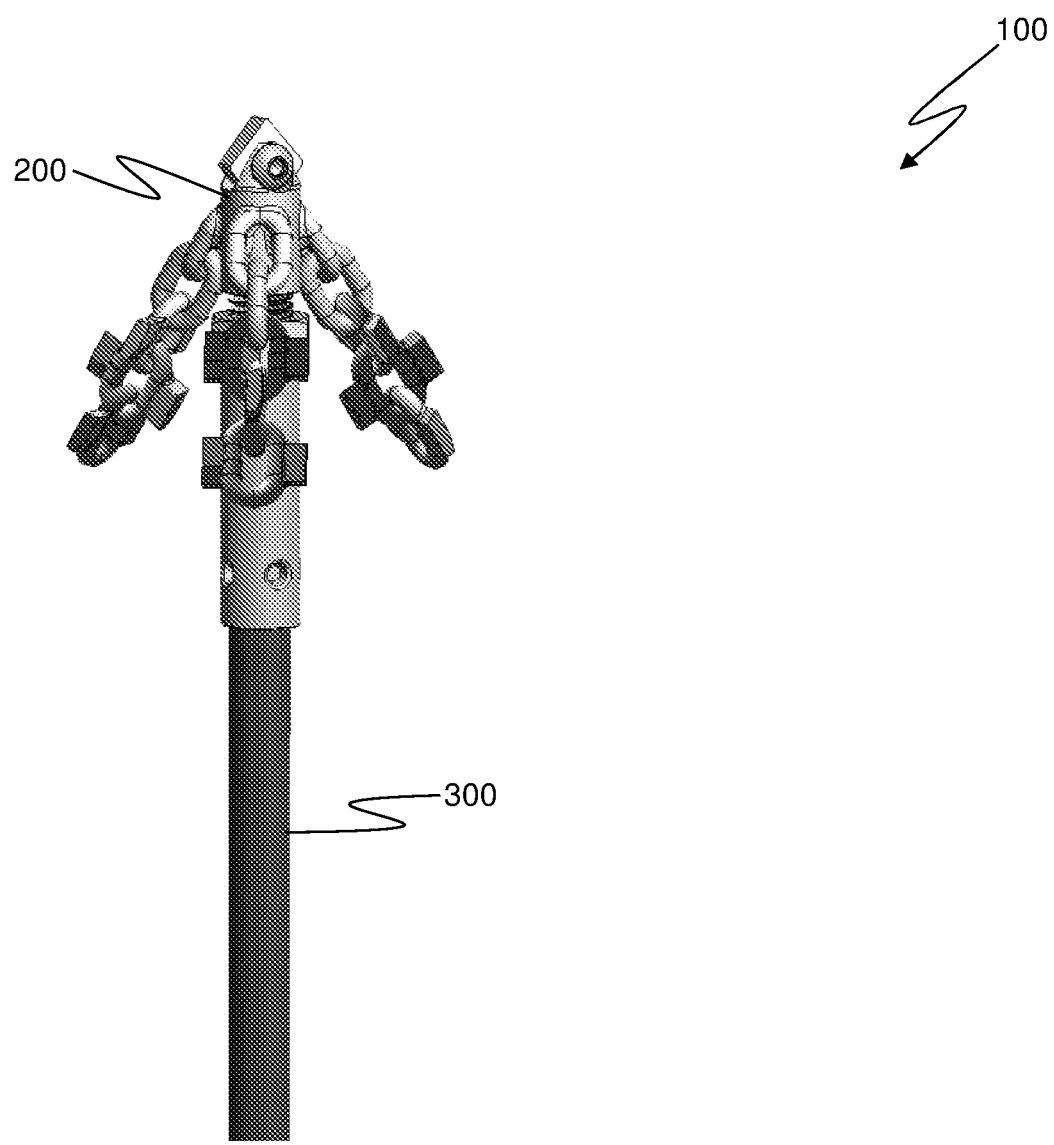
FIG. 14B is a side view of the CDS of FIG. 1, showing the CDA and the extension member connected together, in accordance with one embodiment of the invention.
Figure 15:
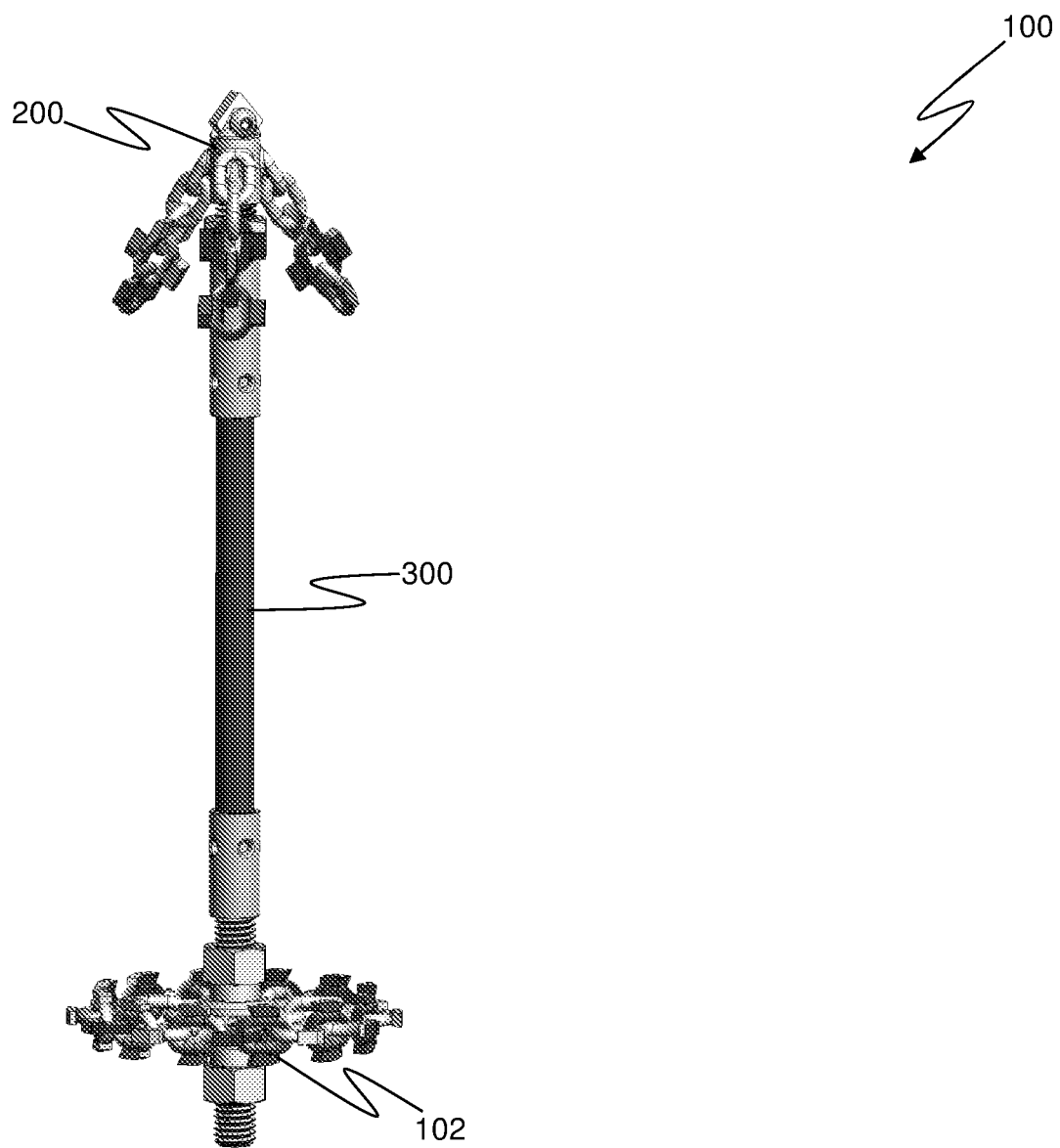
FIG. 15 is a side view of the CDS of FIG. 1, showing the CDA, the FDA and the extension member connected together, in accordance with another embodiment of the invention.

Referring to FIG. 14A, FIG. 14B and FIG. 15, the CDA 102, the FDA 200 and the extension member 300 are shown connected to each other, in accordance with one embodiment of the invention. In this embodiment, the FDA structure second end 206, which is configured in a threaded male configuration, is threadingly located within the second anchor end 112, which is configured in a threaded female configuration. Additionally, the extension member 300 is connected to the CDA 102 by threadingly connecting the extension member first end 302 (which is configured as a threaded female) to the first anchor end 110 of the CDA 102 (which is configured as a threaded male). This embodiment advantageously allows the CDS 100 to includes multiple CDA's 102 and allows the CDS 100 to navigate through curved piping as well. The combination of the multiple CDA's 102, FDA 200 and one or more extension members 300 in this embodiment may be used by associating the first anchor end 110 of one of the multiple CDA's 102, which is configured in a threaded male configuration, with a device, such as a drill.

As above, this advantageously causes the combination of the CDA's 102, the extension members 300 and the FDA 200 to rotate about. As the CDA's 102, the FDA 200 and extension members 300 combination rotates, the CDA's 102, the FDA 200 and extension members 300 combination is inserted into and through a pipe (or other conduit). As the CDA's 102, the FDA 200 and extension members 300 combination rotate, the pointed descaling structure 216 on the FDA structure first end 204 breaks up and dislodges any blockage in the pipe (or other conduit). Additionally, as the CDA's 102, the FDA 200 and extension members 300 combination rotate, the descaling chain rings 106 and the plurality of FDA descaling links 212 contact the inside wall of the pipe (or other conduit), whereby the anchor cutting teeth 118 and the FDA descaling link cutting teeth 214 act to remove debris (i.e. descale) from the surface of the inside wall of the pipe (or other conduit).

It is contemplated that the first anchor end 110, second anchor end 112, FDA structure second end 206, extension member first end 302 and extension member second end 304 may be configured in any configuration combination suitable to the desired end purpose. Moreover, it should be appreciated that the elements of the CDA 102, FDA 200 and extension member 300 may be constructed, wholly or partially, from any material or combination of materials suitable to the desired end purpose, such as silicon carbide, metal, plastic, rubber, composite or any combination of thereof.

While the invention has been described with reference to an exemplary embodiment, it should be understood by those skilled in the art that various changes may be made and equivalents may be substituted for elements thereof without departing from the scope of the invention. Moreover, the embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A Conduit Descaling System (CDS), comprising:
an anchor structure, wherein the anchor structure includes a first anchor end, a second anchor end and a structure center portion and wherein the structure center portion connects the first anchor end with the second anchor end;
a descaling chain ring, wherein the descaling chain ring defines a chain ring center cavity and is connected to the structure center portion; and
a Forward Descaling Article (FDA),
wherein the FDA includes an FDA structure having an FDA structure first end, an FDA structure second end and an FDA structure center portion,
wherein the FDA structure center portion includes a plurality of FDA anchor structures distributed along the circumference of the FDA structure center portion, and
wherein FDA further includes a plurality of FDA descaling links having a plurality of FDA descaling link cutting teeth.

* * * * *